United States Patent [19]

Tomiya et al.

[11] Patent Number: 5,776,237
[45] Date of Patent: Jul. 7, 1998

[54] PROCESS FOR PREPARING PIGMENT COMPOSITION, PIGMENT COMPOSITION AND ITS USE

[75] Inventors: Nobuyuki Tomiya; Mikio Hayashi, both of Tokyo, Japan

[73] Assignee: Toyo Ink Manufacturing Co., Ltd., Tokyo, Japan

[21] Appl. No.: 840,930

[22] Filed: Apr. 25, 1997

[30] Foreign Application Priority Data

Apr. 26, 1996 [JP] Japan .................................. 8-107454

[51] Int. Cl.⁶ .................................................. C09B 67/50
[52] U.S. Cl. ...................... 106/412; 106/31.77; 106/413; 540/140; 540/141
[58] Field of Search .......................... 106/412, 413, 106/31.77; 540/140, 141

[56] References Cited

U.S. PATENT DOCUMENTS 4,369,272  1/1983  Jaffe ........................................ 106/413
4,371,642  2/1983  Jaffe ........................................ 106/413
4,478,968  10/1984 Jaffe ........................................ 106/413

FOREIGN PATENT DOCUMENTS 63-081168  4/1988  Japan ..................................... 106/413
1149778    4/1969  United Kingdom ................... 106/411

*Primary Examiner*—Anthony Green
*Attorney, Agent, or Firm*—Oblon, Spivak, McClelland, Maier & Neustadt, P.C.

[57] ABSTRACT

According to the present invention, a resin is added to crude copper phthalocyanine comprising an α-form and a β-form crystals in combination and dry-milling is performed in a deoxygenated atmosphere, to provide copper phthalocyanine pigment composition of superior quality which reduces considerable expenditure of time and labor associated with the pigmentation process of crude copper phthalocyanine and the printing ink production process of a pigment, and printing ink comprising β-form copper phthalocyanine pigment superior quality.

19 Claims, No Drawings

PROCESS FOR PREPARING PIGMENT COMPOSITION, PIGMENT COMPOSITION AND ITS USE

BACKMILLED OF THE INVENTION

1. Field of the Invention

The present invention relates to a process for preparing β-form copper phthalocyanine pigment composition from crude copper phthalocyanine, and to the pigment composition and its use. More specifically, the present invention relates to a process for preparing β-form copper phthalocyanine pigment by treating crude copper phthalocyanine with a printing ink resin or a printing ink resin containing a solvent, to the pigment composition itself and the process for preparing printing ink from this composition.

2. Description of the Prior Art

Production of printing ink containing a pigment generally requires the following two processes:

The first process is one known as a pigmentation process. Copper phthalocyanine as synthesized is called crude copper phthalocyanine, and is not suitable as a printing ink pigment without further treatment since its β-form crystal particles have large diameters in the range of 10 to 200 μm. The process to reduce the particle size of this crude copper phthalocyanine to a size (from 0.02 to 0.1 μm) suitable for printing ink is called pigmentation. Various methods for pigmentation are known in the art.

The method most generally employed is called the solvent salt milling method. This method involves adding to crude copper phthalocyanine a combination of milling agent such as sodium chloride and organic solvents which promote crystal transformation to β-form and then carrying out the milling process. The β-form copper phthalocyanine pigment obtained by this method has an aspect ratio (ratio of major diameter to minor diameter of a primary particle) from 1 to 3, is suitable for printing ink because of its greenish hue, clearness and high color strength and thus is widely used. In this method, however, the quantity of milling agent required is several times that of the pigment, and considerable amount of time, labor and energy are expended to recover the milling agent and organic solvents.

Another conventional method involves dry-milling crude copper phthalocyanine before it is treated with an organic solvent or other chemicals. In this method, a part of the β-form crystal undergoes transformation to the α-form as a result of mechanical stress during milling. To restore β-form, therefore, the milled material must be subjected to heat treatment with an organic solvent. While this method has cost advantage over the solvent salt milling method, there are some offsetting problems such as the large aspect ratio of the particles as a consequence of their acicular growth during the heat treatment with an organic solvent, resulting in reddish hue and inadequate fluidity of the product. A method exists to suppress such particle growth by adding pigment derivatives and growth inhibitors. These additives, however, are often not desirable as components of printing ink.

The second process is known as an ink-making process. There are generally two methods for preparing printing ink from a pigment, one employs a dry pigment and the other a wet cake pigment usually containing 40 to 70% water. The ink-making method using a dry pigment is one in which a dry pigment is first mixed with a printing ink varnish, solvent, and other additives and then the pigment is dispersed by a device such as a beads mill, or a three-roll mill. Since the primary particles of a dry pigment has a strong agglomerate tendency considerable amount of energy is expended in an effort to disperse the pigment. The method using a wet-cake pigment is called the flushing method. It is a method in which a wet cake pigment is mixed with a printing ink varnish, solvent and other additives to change the phase of the pigment from the water phase to the varnish phase. Though this method requires no energy unlike the ink-making process of a dry pigment, a large-scale apparatus such as a kneader is required and discharged water produced by the flushing process imposes some difficulty.

As described in the preceding section, both the pigmentation process and the ink-making process require expenditure of considerable time and energy for the preparation of printing ink containing β-form copper phthalocyanine. To provide printing ink at low cost, therefore, it would be desirable and efficient to produce ink directly from crude copper phthalocyanine without going through the manipulation of pigments. A method is known in which crude copper phthalocyanine is mixed with printing ink varnish and both the pigmentation and ink-making processes are accomplished simultaneously in a beads mill. However, since the pigmentation process in the printing ink varnish has low milling efficiency, it requires the use of a dispersion mill with ultra-fine beads and one is thus confronted with problems associated with energy efficiency and quality of the final product.

Japanese Patent Application Publication (JP-B) No. 55-6670 proposes a method in which crude copper phthalocyanine is first dry-milled and then made into ink without further steps. Though dry-milling is an effective method since it is inherently efficient, the milled material thus obtained is a mixture of α-form and β-form crystals. The α-form crystal in the mixture must then be reconverted to the β-form in the ink. Form transformation from the α-form to the β-form progresses in the presence of heat and organic solvents and/or proceeds effectively in gravure ink which is rich in aromatic organic solvents. It is not as effective, however, in offset printing ink which contains only a small amount of solvent. Transformation to the β-form is very difficult in solvents containing no aromatic compound (AF solvent) that are becoming increasingly popular.

In this regard, it is known that reduction of agglomeration of milled copper phthalocyanine is an effective means of accomplishing ink-making of this milled material efficiently. Several methods have been proposed. For example, British Patent 1224627 proposes a method in which dry-milling of crude copper phthalocyanine one part is accomplished with the addition of one part to 8 parts of resin. Japanese Patent Application Laid-Open (JP-A) No. 2-294365 proposes a method in which 0.5 to 10% of resin such as a rosin modified phenolic resin is added for the dry-milling of crude copper phthalocyanine. These methods are effective in preventing agglomeration of copper phthalocyanine particles in the presence of the added resin. The rosin modified phenolic resin, however, is known for its tendency to degrade by oxidation even when it is kept at room temperature. For the methods proposed in these patents, it is impossible even under cooling to prevent oxidation of the resin additives during milling, since milling causes increases in surface area and collisional impact generates thermal spikes. Since oxidation changes the solubility, color tone and the other properties of the resins, choosing conventionally used resins for this purpose cannot yield products with characteristics comparable to the conventional ink.

Furthermore, the primary particles of the ink obtained by these methods are characterized by their acicular shape unlike those obtained by the solvent salt milling method. Thus, problems of reddish hue and of fluidity remain unresolved. A known method exists to suppress this particle growth. It involves addition of pigment derivatives and growth inhibitors. These additives, however, are often not desirable as the components of final printing ink.

SUMMARY OF THE INVENTION

The object of the present invention is to provide a high quality copper phthalocyanine pigment composition which reduces considerable time and labor associated with the pigmentation process of crude copper phthalocyanine and with the printing ink production process of a pigment, and to provide printing ink containing β-form copper phthalocyanine pigment of superior quality.

The present invention provides a method for preparing a pigment composition, wherein crude copper phthalocyanine is added to a resin, and dry-milled in a deoxygenated atmosphere. As a means to perform dry-milling in deoxygenated atmosphere, interior of a dry mill can be filled with an inert gas. This is accomplished usually by flowing nitrogen gas. Completely oxygen-free environment is not required. Under some dry-milling conditions, it is sufficient merely to reduce oxygen concentration to a desired level.

The present invention additionally provides a method for preparing pigment composition described above, wherein the resin referred to above is a rosin modified phenol resin. Preferred resins to be added to crude copper phthalocyanine are those resins used in printing ink such as rosin modified phenol resin, rosin modified maleic acid resin, petroleum resin and alkyd resin. They can each be used by itself or in combination of two or more of them. These resins are very effective in promoting form transformation from the α- to β-form crystal of crude copper phthalocyanine.

The present invention further provides a method for preparing the above-mentioned pigment composition, wherein the quantity of said resin to be added is from 1 to 200 wt % of crude copper phthalocyanine. When excessive quantity of resin is added to crude copper phthalocyanine, one runs a considerable risk of causing adhesion and bonding of the resin in the interior of the dry-milling apparatus. Since this phenomenon is influenced in part by the softening point of the resin and by the milling temperature, the quantity of resin to be added has been optimized as specified above. The present invention further provides a method for preparing the above-mentioned pigment composition in which the amount of resin to be added is from 5 to 100% by weight of crude copper phthalocyanine. This range is the result of adjusting more specifically for the softening points of commonly used resins.

The present invention further provides a method for preparing the above-mentioned pigment composition by dry-milling at a temperature between 60° and 200° C. Since the α-form copper phthalocyanine component of crude copper phthalocyanine transforms to the β-form copper phthalocyanine when it is heated, dry-milling is conducted at relatively high temperature to reduce the fraction of the α-form. On the other hand, since milling at too high a temperature adversely affects the copper phthalocyanine pigment, dry-milling of the present invention is conducted at a temperature between 60° and 200° C.

The present invention further provides a method for preparing the above-mentioned pigment composition by dry-milling at a temperature between 80° and 170° C. This temperature range is preferred in consideration of two competing factors, i.e., the adverse effect of oxidation and the promotion of form transformation.

The present invention further provides a method for preparing the above-mentioned pigment composition in which a solvent is added to the resin in an amount ranging from 0.5 to 20 wt % of the said resin. The present invention further provides a method for preparing the above-mentioned pigment composition in which a resin containing a solvent is used. The present invention further provides a method for preparing the above-mentioned pigment composition in which the solvent is a printing ink solvent. The resin and the organic solvent may be separately added, or the solvent may be mixed in the resin prior to addition to the pigment.

The present invention provides a pigment composition obtained by the above-mentioned method for preparing a pigment composition. The present invention provides a pigment composition obtained by adding a resin to crude copper phthalocyanine, and by accomplishing dry-milling in a deoxygenated atmosphere or an atmosphere containing an inert gas. The present invention further provides a pigment composition in which the above-mentioned resin is a rosin modified phenol resin. The present invention provides a pigment composition in which the amount of the above-mentioned resin to be added is from 1 to 200 wt % of the above-mentioned crude copper phthalocyanine. The present invention provides a pigment composition in which amount of the above-mentioned resin to be added is from 5 to 100 wt % by of the above-mentioned crude copper phthalocyanine. The present invention provides a pigment composition in which the temperature of an atmosphere for dry-milling is between 60° and 200° C. The present invention provides a pigment composition in which the temperature of an atmosphere for dry-milling is between 80° and 170° C. The present invention is a pigment composition in which a solvent in an amount ranging from 0.5 to 20 wt % of the above-mentioned resin is added to the above-mentioned crude copper phthalocyanine to which the above-mentioned resin is added. The present invention is a pigment composition in which a solvent in an amount ranging from 0.5 to 20 wt % of the above-mentioned resin is first added to a resin which is then added to the above-mentioned crude copper phthalocyanine.

The present invention further provides a pigment composition in which the above-mentioned solvent is a printing ink solvent. It provides copper phthalocyanine pigment composition of superior quality which reduces considerable time and labor required to prepare copper phthalocyanine for printing ink.

The present invention further provides a method for preparing printing ink, wherein the above-mentioned pigment composition is first added to a printing ink solvent or varnish and then the mixture is processed. The process disclosed in the present invention substantially simplifies the conventional pigmentation process. While oxidation of the added resin adversely affects the performance of the ink in the other similar methods, resin of the present invention is not degraded and it is thus possible to prepare printing ink of the same quality even when the resins employed are those used in the prior art.

The other objects of the present invention will become more apparent as embodiments described below are understood, and those skilled in the art should easily be able to gain advantages which are not explicitly referred to but are implied in this disclosure.

DETAILED DESCRIPTION OF THE INVENTION

The object of the present invention is to provide copper phthalocyanine pigment composition of superior quality thereby reducing time and labor associated with the pigmentation process of crude copper phthalocyanine and the printing ink production process of copper phthalocyanine, and to provide printing ink containing a β-form copper phthalocyanine pigment of superior quality.

According to the present invention, a resin is added to crude copper phthalocyanine, and dry-milling is performed in a deoxygenated atmosphere. When printing ink is prepared conventionally by adding dry-milled β-form crude copper phthalocyanine to an ink solvent or varnish without any prior processing, the milled material exhibits strong agglomeration. As a result, it becomes difficult to disperse pigment particles with ease and to induce form transformation of α-form crystal in the milled material back to the β-form.

In the present invention, preferred resins include to be added to crude copper phthalocyanine in dry-milling, a resin used in printing ink such as a rosin modified phenol resin, rosin modified maleic acid resin, petroleum resin, and alkyd resin. These can each be used by itself or in combination of two or more of them but the rosin modified phenol resin is particularly preferred. These resins are very effective in dispersing the milled material and in promoting transformation from the α-form to the β-form crystal.

When an excessive amount of resin is added, one runs a high risk of causing adhesion and bonding of resin in the interior of a dry mill. This is naturally influenced also by softening point of the resin and by the temperature at which milling is performed. The optimum quantity of resin must thus be determined by taking these factors into consideration. The amount of resin to be added is in the range of 1 to 200 wt % of crude copper phthalocyanine. The duration of milling is adjustable and is determined by the choice of apparatus and the desired particle size of the milled material. The dry-milling process according to the present invention involves milling crude copper phthalocyanine without the substantial presence of liquid medium by using a mill loaded with milling medium such as beads. The milling is accomplished by the milling force and destructive force generated by collision between the elements of milling media. Dry-milling can be performed by conventional means known in the art such as a dry attritor, ball mill, and vibration mill. Dry-milling may be conducted in a deoxygenated environment, as needed, by flushing the interior of the dry-milling apparatus by nitrogen gas flow. The dry-milling according to the present invention is conducted in a deoxygenated atmosphere to prevent degradation of the added resin during milling and thus to develop attributes designed for the ink.

Negative effects of oxidation of the added resin include poor dissolution of ink in a fountain solution in the case of an offset printing ink. This is probably caused by the reduction in surface tension of the resin by its oxidation. This adversely affects the properties of an offset printing ink. As a means to perform dry-milling in deoxygenated atmosphere, interior of a dry mill can be filled with an inert gas. This is most commonly accomplished by introducing nitrogen gas flow. Completely oxygen-free environment is not required. Under some dry-milling conditions, it is sufficient merely to reduce oxygen concentration to a desired level. The deoxygenated condition according to the present invention, therefore, is to be understood as the oxygen concentration less than 10%. Reducing oxygen in this manner further enhances safety.

Since dry-milled crude copper phthalocyanine is a mixture of α-form and β-form crystals, complete conversion to the β-form is required either by treating in an organic solvent or by mixing it with a printing ink solvent or varnish. While it is possible to select the optimum organic solvent for this purpose and such selection of a printing ink solvent poses no particular difficulty for solvent containing aromatic compound such as gravure printing ink, optimization for solvents containing no aromatic compound is significantly more difficult. In the present invention, however, transformation to the β-form is facilitated by using the treated pigment which has been dry-milled in the presence of a resin. Specifically, since dispersion of particles is accelerated by dissolution of the treated resin in a solvent, transformation to the β-form proceeds easily even for printing ink solvents containing no aromatic compound.

On the other hand, when the transformation of the α-form to β-form takes place in the presence of an organic solvent, some of the particles are dissolved and result in acicular growth of pigment particles, with undesirable consequences such as reddish hue and poor fluidity. It is preferable, therefore, to restrict the fraction of α-form crystal in the dry-milled material. It is generally known that the transformation from the α-form to β-form takes place in the presence of heat and/or an organic solvent. Therefore, one means by which to lower the fraction of the α-form crystal in dry-milling is to perform dry-milling at a relatively high temperature. Since excessively high temperature adversely affects copper phthalocyanine pigment itself, the dry-milling of the present invention should preferably be performed at a temperature between 60° and 200° C.

Addition of an organic solvent is also effective in lowering the fraction of the α-form crystal in dry-milling. In the present invention, an organic solvent may also be added together with a resin. Since excessive solvent addition is not recommended for dry-milling, the fraction to be added is in the range from 0.5 to 20 wt % of the resin.

In the present invention, when a solvent and resin are added in dry-milling of crude copper phthalocyanine, a resin and organic solvent may either be separately added or an organic solvent may be folded in the resin beforehand.

Organic solvents capable of inducing transformation from the α-form to β-form crystal are preferred. Examples of such solvents include aromatic compounds such as toluene, xylene, chlorobenzene and nitrobenzene, aliphatic hydrocarbon compounds such as mineral spirit, kerosine and ligroine, alcohol compounds such as isopropanol, butanol, isobutanol, ethyl cellosolve, butyl cellosolve, and cyclohexanol, ester compounds such as ethyl acetate, butyl acetate and butyl cellosolve acetate, and ketone compounds such as acetone and methyl ethyl ketone. These compounds may each be used by itself or in combination of two or more. When printing ink is prepared directly, it is possible to use printing ink solvents which require no process of solvent removal. As printing ink solvents, solvents containing no aromatic compound can also be used alone or in combination of two or more as long as they are solvents suitable for printing ink such as petroleum-type solvents having high boiling point, aliphatic hydrocarbon solvents, and higher alcohol-type solvent.

Since the milled material obtained is a mixture of α-form and β-form crystals, all of them should be changed to β-form by treating with an organic solvent. There are two methods to accomplish this task: one method involves transformation to the β-form taking place in a printing ink solvent followed by the direct preparation of printing ink and the other involves the conversion to the β-form by treating in one of the above-mentioned organic solvents with ability to induce transformation to the β-form.

When the transformation to the β-form takes place in a printing ink solvent, the transformation proceeds at an adequate rate by gentle stirring and there is no particular need for any dispersing means. The dispersion of the milled material and the transformation to the β-form are completed in several tens of minutes to 3 hours depending on the choice of printing ink solvent. Preparation of the ink base is then completed by passing the material through a simple dispersing machine. Processing at an elevated temperature increases the efficiency of the β transformation.

When a shortened processing time is desired, use of a conventional dispersing machine such as a beads mill can produce dramatic reduction of processing time. When printing ink is to be prepared directly using the pigment composition obtained in the process described in the preceding section, solvents containing no aromatic compound can also be used as printing ink solvents or solvents in a varnish by itself or in combination of two or more as long as they are solvents suitable for printing ink such as a petroleum-type solvents having high boiling point, aliphatic hydrocarbon solvents, and higher alcohol-type solvents.

Similarly, when printing ink is produced, examples of printing ink varnish resins include resins suitable for printing ink such as rosin modified phenol resins, rosin modified maleic acid resins, petroleum resins, and alkyd resins. They can be used in combination of a drying oil and polymerized drying oil compatible with printing ink such as soybean oil, tung oil and linseed oil and with other additives for printing ink. They can each be used by itself or in combination of two or more.

On the other hand, when β-form copper phthalocyanine pigment is prepared by solvent treatment of the milled material obtained, the solvent treatment takes place usually in an organic solvent by itself or in a mixture of an organic solvent and water. In the case of the mixture, it is used without any modification when the solvent has high affinity with water. When the solvent has little or no affinity with water, the mixture used is normally emulsified with a surfactant. The organic solvent mentioned above which promotes transformation to the β-form can be used as the organic solvent in this process.

Samples of ink produced by these methods were compared with ones which were prepared by ink-making process starting with a dry pigment obtained by the conventional solvent salt milling method, and with ones which were prepared by ink-making process employing the flushing method starting with a wet cake pigment containing water. It was confirmed that the ink produced by the methods of the present invention has equivalent quality as the ink prepared by the solvent salt milling method and by the flashing method with respect to color strength, gloss, and fluidity.

DESCRIPTION OF THE PREFERRED EMBODIMENTS

Practical details of the present invention will be described in terms of examples and comparative examples to follow:

The standard ink referred to in the following examples is β-form copper phthalocyanine pigment ink prepared by the flashing method using the wet cake pigment obtained by pigmentation of crude copper phthalocyanine by the solvent salt milling method (5 parts of sodium chloride to one part of source material). The composition of the varnish used in preparing ink is 47% of rosin modified phenol resin, 47% of printing ink solvent (solvent identical to the one separately added) and 6% of linseed oil. All the ink samples prepared as the standard. Examples and Comparative Examples were first adjusted to the same tack value (inkometer reading) and then 0.3 cc in each case was printed on an Art paper (250×270 cm) using RI tester (RI-2 type, Hikari Seisakusho K.K.). Color strength was evaluated by PRESSMATE model 110 densitometer (Koser Corp.) and gloss was evaluated by Digital deformation glossmeter (Suga Shikenkisha K.K.). Crystal structure of copper phthalocyanine was determined by X-ray diffractometer.

[EXAMPLE 1]

A dry attritor was charged with 70 parts by weight of crude copper phthalocyanine and 7 parts by weight of a rosin modified phenol resin having a softening point of 160° C. The mixture was milled for 1 hour at 160° C. in flowing nitrogen. The resin was extracted from the pigment composition thus obtained and the properties of the extracted resin were measured revealing no significant changes compared to those before the milling. 18 parts by weight of the resulting milled material was added to 44 parts by weight of a printing ink varnish and 5 parts by weight of NO. 7 solvent (Nippon Oil Co., Ltd.). The resulting mixture was gently stirred for 4 hours at 120° C. The mixture was then kneaded by a three-roll mill at 60° C. for three passes to yield dispersed pigment particles of size less than 7.5 μm. 22 parts by weight of a varnish and 11 parts by weight of NO. 7 solvent (Nippon Oil Co., Ltd.) were then added to the paste ink thus obtained to prepare the ink, the end product. It was compared with the standard ink containing the same pigment fraction. The ink of the example had qualities equivalent to the standard ink in terms of color strength, gloss, hue, and dispersibility in wetting water. The fraction of the α-form crystal was less than 1%.

[EXAMPLE 2]

A dry attritor was charged with 70 parts by weight of crude copper phthalocyanine and 35 parts by weight of a rosin modified phenol resin having a softening point of 160° C. They were milled for 1 hour at 130° C. in following nitrogen. The resin was extracted from the pigment composition thus obtained and the properties were measured to reveal no significant changes as compared to those before the milling. Then 32 parts by weight of a printing ink varnish and 11 parts by weight of NO. 7 solvent (Nippon Oil Co., Ltd.) were added to 24 parts by weight of the resulting milled material. The resulting mixture was gently stirred for 2 hours at 100° C. The mixture was then kneaded by a three-roll mill at 60° C. for a single pass to yield dispersed pigment particles of size less than 7.5 μm. 22 parts by weight of a varnish and 11 parts by weight of NO. 7 solvent (Nippon Oil Co., Ltd.) were then added to the paste ink thus obtained to prepare the ink, the end product. It was compared with the standard ink containing the same pigment fraction. The ink of the example had qualities equivalent to the standard ink in color strength, gloss, hue, and dispersibility in wetting water. The fraction of the α-form crystal was less than 1%.

[EXAMPLE 3]

A dry attritor was charged with 70 parts by weight of crude copper phthalocyanine and 70 parts by weight of a rosin modified phenol resin having a softening point of 160° C. The mixture was milled for 1 hour at 80° C. in flowing nitrogen.

The resin was extracted from the pigment composition thus obtained and its properties were measured to reveal no significant changes as compared to those before the treatment. 16 parts by weight of a printing ink varnish and 19 parts by weight of NO. 7 solvent (Nippon Oil Co., Ltd.) were then added to 32 parts by weight of the milled material thus obtained. The resulting mixture was gently stirred for 2 hours at 100° C. The mixture was then kneaded by a three-roll mill at 60° C. for a single pass to yield dispersed pigment particles of size less than 7.5 μm. 22 parts by weight of a varnish and 11 parts by weight of NO. 7 solvent (Nippon Oil Co., Ltd.) were then added to the resulting paste ink to prepare the ink, the end product. It was compared with the standard ink containing the same pigment fraction. The ink of the example had qualities equivalent to the standard ink in color strength, gloss, and dispersibility in wetting water. The fraction of the α-form crystal was less than 1%.

[Comparative Example 1]

A dry attritor was charged with 70 parts by weight of crude copper phthalocyanine, and the load was milled for 1 hour at 130° C. in air. 48 parts by weight of a printing ink varnish and 3 parts by weight of NO. 7 solvent (Nippon Oil Co., Ltd.) were then added to 16 parts by weight of the resulting milled material. The resulting mixture was gently stirred for 4 hours at 110° C. Then it was kneaded by a three-roll mill at 60° C. for three passes to yield the maximum pigment particle size of 12.5 μm. 22 parts by weight of a varnish and 11 parts by weight of NO. 7 solvent (manufactured by Nippon Oil Co., Ltd.) were then added to the resulting paste ink to prepare the ink, the end product. It was compared with the standard ink containing the same pigment fraction. The ink of this comparative example had reddish hue and the fraction of the α-form crystal was 6%.

[Comparative Example 2]

A dry attritor was charged with 70 parts by weight of crude copper phthalocyanine and 35 parts by weight of a rosin modified phenol resin having a softening point of 160° C., and they were milled for 1 hour at 160° C. in air.

The resin was extracted from the pigment composition thus obtained and its properties were measured. Reduction in solubility was noted. 32 parts by weight of a printing ink varnish and 11 parts by weight of NO. 7 solvent (Nippon Oil Co., Ltd.) were then added to 24 parts by weight of the milled material thus obtained. The resulting mixture was gently stirred for 3 hours at 90° C. The mixture was then kneaded by a three-roll mill at 60° C. for a single pass to yield the maximum pigment particle size of 7.5 μm. 22 parts by weight of a varnish and 11 parts by weight of NO. 7 solvent (Nippon Oil Co., Ltd.) were then added to the resulting paste ink were added to prepare the ink, the end product, and it was compared with the standard ink containing the same pigment fraction. The ink of this comparative example had inferior dispersibility in wetting water compared to the standard ink.

[Comparative Example 3]

A dry attritor was charged with 70 parts by weight of crude copper phthalocyanine and 70 parts by weight of a rosin modified phenol resin having a softening point of 160° C. They were milled for 1 hour at 80° C. in air. The resin was extracted from the pigment composition thus obtained and its properties were tested. Reduction in solubility was observed. 16 parts by weight of a printing ink varnish and 19 parts by weight of NO. 7 solvent (Nippon Oil Co., Ltd.) were then added to 32 parts by weight of the milled material thus obtained. The resulting mixture was gently stirred for 2 hours at 100° C. The mixture was then kneaded by a three-roll mill at 60° C. for a single pass to yield a dispersed pigment particle size of less than 7.5 μm. 22 parts by weight of a varnish and 11 parts by weight of NO. 7 solvent (Nippon Oil Co., Ltd.) were then added to the paste ink thus obtained to prepare the ink, the end product. It was compared with the standard ink containing the same pigment fraction. The ink of this comparative example had inferior dispersibility in wetting water compared to the standard ink. The fraction of the α-form crystal was less than 1%.

[EXAMPLE 4]

A dry attritor was charged with 70 parts by weight of crude copper phthalocyanine and 35 parts by weight of a rosin modified phenol resin, and they were milled for 1 hour at 80° C. in a deoxygenated atmosphere. 32 parts by weight of a printing ink varnish and 11 parts by weight of NO. 7 solvent (Nippon Oil Co., Ltd.) were then added to 24 parts by weight of the milled material thus obtained. The resulting mixture was gently stirred for 2 hours at 90° C., then it was kneaded by a three-roll mill at 60° C. for a single pass to yield pigment particle size of less than 7.5 μm. 22 parts by weight of a varnish and 11 parts by weight of NO. 7 solvent (Nippon Oil Co., Ltd.) were then added to the resulting paste ink to prepare the ink, the end product. It was compared with the standard ink containing the same pigment fraction. The ink of this example had the fraction of the α-form crystal of less than 1%. Its hue, however, was slightly reddish.

[EXAMPLE 5]

A dry attritor was charged with 70 parts by weight of crude copper phthalocyanine and 7 parts by weight of a rosin modified phenol resin, and they were milled for 1 hour at 90° C. in a deoxygenated atmosphere. Then 22 parts by weight of the resulting milled material was added to 100 parts by weight of water and 60 parts by weight of isobutanol. The resulting mixture was gently stirred for 1 hour under azeotropic condition, and subsequently isobutanol was removed by distillation. Then, 8 parts by weight of 35% hydrochloric acid was added for acid purification. The purified mixture was then filtered and dried. Ink thus obtained had the fraction of the α-form crystal of less than 1%. Its hue, however, was slightly reddish.

[EXAMPLE 6]

A dry attritor was charged with 70 parts by weight of crude copper phthalocyanine, 30 parts by weight of a rosin modified phenol resin and 5 parts by weight of NO. 7 solvent (Nippon Oil Co., Ltd.), and they were milled for 1 hour at 80° C. in a deoxygenated atmosphere. Then 24 parts by weight of the resulting milled material was added to 36 parts by weight of a printing ink varnish and 7 parts by weight of NO. 7 solvent (Nippon Oil Co., Ltd.), and the resulting mixture was gently stirred for 2 hours at 90° C. The mixture then was kneaded by a three-roll mill at 60° C. for a single pass to yield dispersed pigment of particle size less than 7.5 μm. 22 parts by weight of a varnish and 11 parts by weight of NO. 7 solvent (Nippon Oil Co., Ltd.) were then added to the resulting paste ink to obtain the ink, the end product. It was compared with the standard ink containing the same pigment fraction. The ink of the example had qualities equivalent to the standard ink in color strength, gloss, and hue. The fraction of the α-form crystal was less than 1%.

[EXAMPLE 7]

A dry attritor was charged with 70 parts by weight of crude copper phthalocyanine, 63 parts by weight of a rosin modified phenol resin and 7 parts by weight of NO. 7 solvent (Nippon Oil Co., Ltd.), and they were milled for 1 hour at 70° C. in a deoxygenated atmosphere. 22 parts by weight of a printing ink varnish and 13 parts by weight of NO. 7 solvent (Nippon Oil Co., Ltd.) were then added to 32 parts by weight of the resulting milled material. The resulting mixture was gently stirred for 2 hours at 90° C., then it was kneaded by a three-roll mill at 60° C. for a single pass to yield dispersed pigment particle size of less than 7.5 µm. 22 parts by weight of a varnish and 11 parts by weight of NO. 7 solvent (Nippon Oil Co., Ltd.) were then added to the paste ink thus obtained to obtain the ink, the end product. It was compared with the standard ink containing the same pigment fraction. The ink of the example had qualities equivalent to the standard ink in color strength, gloss, and hue. The fraction of the α-form crystal was less than 1%.

[EXAMPLE 8]

One hundred parts by weight of the same rosin modified phenol resin as used in Example 7 were heated to the softening point. 10 parts by weight of NO. 7 solvent (Nippon Oil Co., Ltd.) were added to this preparation so that the solvent is contained in the resin. A dry attritor was charged with 70 parts by weight of crude copper phthalocyanine and 70 parts by weight of the rosin modified phenol resin in which the solvent was contained, and they were milled for 1 hour at 70° C. in a deoxygenated atmosphere. 32 parts by weight of the resulting milled material was then added to 22 parts by weight of a printing ink varnish and 13 parts by weight of NO. 7 solvent (Nippon Oil Co., Ltd.). The resulting mixture was gently stirred for 2 hours at 90° C. Then the mixture was kneaded by a three-roll mill at 60° C. for a single pass to yield a dispersed pigment particle size less than 7.5 µm. 22 parts by weight of a varnish and 11 parts by weight of NO. 7 solvent (Nippon Oil Co., Ltd.) were then added to the resulting paste ink to obtain the ink, the end product. It was compared with the standard ink containing the same pigment fraction. The ink of the example had qualities equivalent to the standard ink in color strength, gloss, and hue. The fraction of the α-form crystal was less than 1%.

[EXAMPLE 9]

One hundred parts by weight of the same rosin modified phenol resin as used in Example 7 was heated to the softening point. 20 parts by weight of NO. 7 solvent (Nippon Oil Co., Ltd.) were added to the above so that the solvent is contained in the resin. A dry attritor was charged with 70 parts by weight of crude copper phthalocyanine and 7 parts by weight of the rosin modified phenol resin in which the solvent was contained, and they were milled for 1 hour at 90° C. in a deoxygenated atmosphere. Then 22 parts by weight of the resulting milled material was added to 100 parts by weight of water and 60 parts by weight of isobutanol. The resulting mixture was gently stirred for 1 hour under azeotropic condition, and then isobutanol was removed by distillation. 8 parts by weight of 35% hydrochloric acid was then added to accomplish acid purification. The product was then filtrated and dried. The ink thus obtained had the fraction of the α-form crystal of less than 1%. When this pigment was compared with the standard pigment, the pigment of the example had hue equivalent to that of the standard pigment.

[Comparative Example 4]

A dry attritor was charged with 70 parts by weight of crude copper phthalocyanine, and it was milled for 1 hour at 80° C. in a deoxygenated atmosphere. Then 16 parts by weight of the resulting milled material were added to 48 parts by weight of a printing ink varnish and 3 parts by weight of NO. 7 solvent (Nippon Oil Co., Ltd.). The resulting mixture was gently stirred for 2 hours at 90° C. The mixture was then kneaded by a three-roll mill at 60° C. for three passes to yield dispersed pigment particle size not less than 10.0 µm. 22 parts by weight of a varnish and 11 parts by weight of NO. 7 solvent (Nippon Oil Co., Ltd.) were then added to the resulting paste ink to obtain the ink, the end product. It was compared with the standard ink containing the same pigment fraction. The ink of this comparative example had the fraction of the α-form crystal of less than 1%. Its hue, however, was reddish.

The present invention can be reduced to practice in the other embodiments than the ones described above. The expressions and terms used in this specification are intended for explanatory purposes only and should not in any way be construed to limit the scope of the present invention. Therefore, any variation within the range of the appended claims and equivalents to the essence of the invention and are deemed to be within the claims and scope of this invention.

What is claimed is:

1. A method for preparing a pigment composition comprising the steps of adding a resin effective for controlling transformation of crude copper phthalocyanine from α-crystal form to β-crystal form, to crude copper phthalocyanine in an amount of from 1 to 200% by weight of said crude copper phthalocyanine, and performing dry-milling in an atmosphere which is selected from the group consisting of a deoxygenated atmosphere and an atmosphere containing inert gas.

2. The method of preparing a pigment composition according to claim 1, wherein said resin is selected from the group consisting of a rosin modified phenol resin, a rosin modified maleic acid resin, petroleum resin and alkyd resin.

3. The method for preparing a pigment composition according to claim 2, wherein said resin is added in an amount of from 5 to 100% by weight of said crude copper phthalocyanine.

4. The method of preparing a pigment composition according to claim 1, wherein the atmosphere for the dry-milling is at a temperature between 60° and 200° C.

5. The method for preparing a pigment composition according to claim 1, wherein the atmosphere for the dry-milling is at a temperature between 80° and 170° C.

6. The method for preparing a pigment composition according to claim 1, wherein said resin is added with an organic solvent capable of inducing transformation of crude copper phthalocyanine from α-crystal form to β-crystal form, said solvent being in an amount ranging from 0.5 to 20% by weight of said resin.

7. The method for preparing a pigment composition according to claim 1, wherein an organic solvent capable of inducing transformation of crude copper phthalocyanine from α-crystal form to β-crystal form is added to said resin in an amount ranging from 0.5 to 20% by weight of said resin prior to the addition of said resin to said crude copper phthalocyanine.

8. The method for preparing a pigment composition according to claim 6, wherein said solvent is a printing ink solvent.

9. A pigment composition obtained by adding a resin effective for promoting transformation of crude copper phthalocyanine from α-crystal form to β-crystal form, to crude copper phthalocyanine in a transformation effective amount and dry-milling in an atmosphere which is selected from the group consisting of a deoxygenated atmosphere and an atmosphere containing inert gas.

10. The pigment composition according to claim 9, wherein said resin is a rosin modified phenol resin.

11. The pigment composition according to claim 10, wherein said resin is added in the range from 1 to 200% by weight of said crude copper phthalocyanine.

12. The pigment composition according to claim 10, wherein said resin is added in the range from 5 to 100% by weight of said crude copper phthalocyanine.

13. The pigment composition according to claim 9, wherein the atmosphere for the dry-milling is at a temperature between 60° and 200° C.

14. The pigment composition according to claim 9, wherein the atmosphere for the dry-milling is at a temperature between 80° and 170°C.

15. The pigment composition according to claim 9, wherein said resin is added with an organic solvent capable of inducing transformation of crude copper phthalocyanine from α-crystal form to β-crystal form, said solvent being in an amount ranging from 0.5 to 20% by weight of said resin.

16. The pigment composition according to claim 9, wherein an organic solvent capable of inducing transformation of crude copper phthalocyanine from α-crystal form to β-crystal form, is added to said resin in an amount ranging from 0.5 to 20% by weight of resin prior to the addition of said resin to crude copper phthalocyanine.

17. The pigment composition according to claim 15, wherein said solvent is a printing ink solvent.

18. A method for preparing a printing ink, wherein the pigment composition of claim 9 is added in printing ink effective amounts to a printing ink solvent to produce the printing ink.

19. A method for preparing a printing ink, wherein the pigment composition of claim 9 is added in printing ink effective amounts to a printing ink varnish to produce the printing ink.

* * * * *